(12) United States Patent
Waggoner et al.

(10) Patent No.: US 11,583,811 B2
(45) Date of Patent: *Feb. 21, 2023

(54) ADJUSTABLE ADDITIVE CARTRIDGE SYSTEMS

(71) Applicant: CIRKUL, INC., Tampa, FL (US)

(72) Inventors: Garrett S. Waggoner, Sarasota, FL (US); Andrew Gay, Mill Creek, WA (US); Leo Riza, Sarasota, FL (US); Erkan Riza, Sarasota, FL (US)

(73) Assignee: Cirkul, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,087

(22) Filed: Nov. 21, 2016

(65) Prior Publication Data

US 2017/0232406 A1 Aug. 17, 2017
US 2020/0016551 A9 Jan. 16, 2020

Related U.S. Application Data

(63) Continuation of application No. 14/948,225, filed on Nov. 20, 2015, now Pat. No. 9,498,086.

(Continued)

(51) Int. Cl.
*A47J 43/27* (2006.01)
*B01F 23/451* (2022.01)
(Continued)

(52) U.S. Cl.
CPC ........... *B01F 23/451* (2022.01); *A47J 31/005* (2013.01); *A47J 41/0083* (2013.01); *A47J 43/27* (2013.01);
(Continued)

(58) Field of Classification Search
CPC ................. A47G 19/24; A47J 43/27
(Continued)

(56) References Cited

U.S. PATENT DOCUMENTS 1,674,233 A * 6/1928 Williams ............... A47G 19/24
222/142.1
1,961,321 A 6/1934 Young
(Continued)

FOREIGN PATENT DOCUMENTS

AU 2015349694 A1 6/2017
CA 2777990 A1 11/2013
(Continued)

OTHER PUBLICATIONS

ISR and WO in PCT/US2017/021016 dated Jun. 6, 2017.
(Continued)

*Primary Examiner* — David L Sorkin
(74) *Attorney, Agent, or Firm* — John F. Rollins

(57) ABSTRACT

An adjustable additive cartridge that provides adjustable metering of additive to a base fluid as the base fluid is flowing through the cartridge. A spout is mounted for limited rotation within a base element of the cartridge. Rotation of the spout results in varying degrees of flow of additive into a base fluid flow path through the cartridge. The cartridge may be used with a portable beverage container, such as a sports bottle or off-the-shelf water bottle. The supply of base fluid in a container used with the cartridge may be kept in an unmixed, pure state, and other cartridges, each having different additives (i.e., flavors) may be used interchangeably with the same base fluid supply. The cartridge allows a consumer/user to experience different additives, such as different flavors or supplement compositions, for a given supply of base liquid in a single container. A check valve on the cartridge prevents backflow of the base fluid. An integrated filter for filtering base fluid flowing into the cartridge may be provided. The additive cartridge may be sealed to provide for extended storage and to provide a user/consumer with evidence of integrity, quality and/or tampering prior to purchase and/or use. Visual and tactile indicators of the (Continued)

amount of additive being added to a base fluid may be provided. A container may retain a spare additive adjustable cartridge on the container.

20 Claims, 12 Drawing Sheets

Related U.S. Application Data

(60) Provisional application No. 62/083,129, filed on Nov. 21, 2014.

(51) Int. Cl.
*A47J 41/00* (2006.01)
*B65D 51/28* (2006.01)
*B01F 25/315* (2022.01)
*B01F 25/314* (2022.01)
*B01F 33/501* (2022.01)
*A47J 31/00* (2006.01)
*B65D 47/06* (2006.01)
*B01F 23/40* (2022.01)
*B01F 101/14* (2022.01)

(52) U.S. Cl.
CPC ........ *B01F 25/315* (2022.01); *B01F 25/3142* (2022.01); *B01F 25/31433* (2022.01); *B01F 33/50111* (2022.01); *B65D 47/06* (2013.01); *B65D 51/2892* (2013.01); *B01F 23/483* (2022.01); *B01F 2101/14* (2022.01)

(58) Field of Classification Search
USPC ............................. 366/130; 222/142.1, 145.5
See application file for complete search history.

(56) References Cited

U.S. PATENT DOCUMENTS

| | | |
|---|---|---|
| 2,073,273 A | 3/1937 | Korn et al. |
| 2,102,105 A | 12/1937 | Edward |
| 3,207,486 A | 9/1965 | Daniel |
| 3,217,931 A | 11/1965 | Farrar et al. |
| 3,255,691 A | 6/1966 | Marius et al. |
| 3,325,056 A | 6/1967 | Lewis |
| 3,347,403 A | 10/1967 | David |
| 3,463,361 A | 8/1969 | Cook et al. |
| 3,506,460 A | 4/1970 | Bayne |
| 3,508,682 A | 4/1970 | Hollis et al. |
| 3,760,986 A | 9/1973 | Castner et al. |
| 3,850,346 A | 11/1974 | Richardson et al. |
| 3,924,741 A | 12/1975 | Kachur et al. |
| 4,115,066 A | 9/1978 | Muhle |
| 4,132,308 A | 1/1979 | Goncalves |
| 4,221,291 A | 9/1980 | Hunt |
| 4,315,570 A | 2/1982 | Silver et al. |
| 4,785,974 A | 11/1988 | Rudick et al. |
| 4,838,457 A | 6/1989 | Swahl et al. |
| 4,892,125 A | 1/1990 | Rudick et al. |
| 5,045,195 A | 9/1991 | Spangrud et al. |
| 5,092,750 A | 3/1992 | Leroy et al. |
| 5,094,861 A | 3/1992 | D'Auguste et al. |
| 5,165,569 A | 11/1992 | Furuhashi et al. |
| 5,246,139 A | 9/1993 | Duceppe |
| 5,325,996 A | 7/1994 | Bannigan |
| 5,419,445 A | 5/1995 | Kaesemeyer |
| 5,664,702 A | 9/1997 | Beauchamp |
| 5,707,353 A | 1/1998 | Mazer et al. |
| 5,839,626 A | 11/1998 | Gross et al. |
| 5,890,624 A | 4/1999 | Klima et al. |
| 5,899,363 A | 5/1999 | Bliss et al. |
| 5,919,360 A | 7/1999 | Contaxis et al. |
| 5,944,234 A | 8/1999 | Lampe et al. |
| 5,984,141 A | 11/1999 | Gibler |
| 5,992,690 A | 11/1999 | Tracy |
| 6,003,728 A | 12/1999 | Elliott |
| 6,010,034 A | 1/2000 | Walthers |
| 6,136,189 A | 10/2000 | Smith et al. |
| 6,165,523 A | 12/2000 | Story |
| 6,180,149 B1 | 1/2001 | Gramm |
| 6,209,757 B1 | 4/2001 | Dumont |
| 6,230,923 B1 | 5/2001 | Hung |
| 6,230,937 B1 | 5/2001 | Johnson et al. |
| 6,263,924 B1 | 7/2001 | Grosser |
| 6,395,170 B1 | 5/2002 | Hughes et al. |
| 6,482,451 B1 | 11/2002 | Baron |
| 6,517,878 B2 | 2/2003 | Heczko |
| 6,541,055 B1 | 4/2003 | Luzenberg |
| 6,569,329 B1 | 5/2003 | Nohren, Jr. |
| 6,705,490 B1 | 3/2004 | Lizerbram et al. |
| 6,705,491 B1 | 3/2004 | Lizerbram et al. |
| 6,820,740 B1 | 11/2004 | Spector |
| 6,959,839 B2 | 11/2005 | Roth et al. |
| 6,981,962 B1 | 1/2006 | Lenkersdorf |
| 7,083,071 B1 | 8/2006 | Crisp, III et al. |
| 7,118,012 B2 | 10/2006 | Butler |
| 7,306,117 B2 | 12/2007 | Roth et al. |
| 7,503,453 B2 | 3/2009 | Cronin et al. |
| 7,533,786 B2 | 5/2009 | Woolfson et al. |
| 7,568,576 B2 | 8/2009 | Sweeney et al. |
| 7,661,561 B2 | 2/2010 | Ophardt et al. |
| 7,670,479 B2 | 3/2010 | Arett et al. |
| 7,806,294 B2 | 10/2010 | Gatipon et al. |
| 7,819,276 B2 | 10/2010 | Næsje |
| 7,909,210 B2 | 3/2011 | Roth et al. |
| 7,942,569 B2 | 5/2011 | Orben et al. |
| 7,947,316 B2 | 5/2011 | Kirschner et al. |
| 8,083,055 B2 | 12/2011 | Simonian et al. |
| 8,141,700 B2 | 3/2012 | Simonian et al. |
| 8,167,174 B2 | 5/2012 | Berger |
| 8,182,683 B1 | 5/2012 | Allen |
| 8,230,777 B2 | 7/2012 | Anson et al. |
| 8,302,803 B1 | 11/2012 | Greenberg et al. |
| 8,306,655 B2 | 11/2012 | Newman |
| 8,313,644 B2 | 11/2012 | Harris et al. |
| 8,365,960 B1 | 2/2013 | Kalaouze |
| 8,413,844 B2 | 4/2013 | Arett et al. |
| 8,453,833 B2 | 6/2013 | Porter |
| 8,464,633 B2 | 6/2013 | Anson et al. |
| 8,511,465 B2 | 8/2013 | Seelhofer |
| 8,541,039 B2 | 9/2013 | Lackey et al. |
| 8,590,753 B2 | 11/2013 | Marina et al. |
| 8,622,237 B2 | 1/2014 | Choi et al. |
| 8,641,016 B2 | 2/2014 | Tatera |
| 8,684,231 B2 | 4/2014 | Lane et al. |
| 8,684,240 B2 | 4/2014 | Sauer et al. |
| 8,893,927 B2 | 11/2014 | Olson et al. |
| 8,931,634 B2 | 1/2015 | Anderson |
| 9,010,379 B2 | 4/2015 | Gothard et al. |
| 9,060,592 B2 | 6/2015 | Brosius |
| 9,090,395 B2 | 7/2015 | Koumans |
| 9,174,777 B2 | 11/2015 | Defemme et al. |
| 9,302,831 B2 | 4/2016 | Wilson et al. |
| 9,498,086 B2 * | 11/2016 | Waggoner ............... A47J 43/27 |
| 9,650,189 B1 | 5/2017 | Lawson et al. |
| 9,694,953 B2 | 7/2017 | Meyers et al. |
| 9,771,195 B2 | 9/2017 | Lawson et al. |
| 9,795,242 B2 * | 10/2017 | Waggoner ............ A47J 31/005 |
| 9,801,492 B1 | 10/2017 | Lin |
| 9,821,288 B2 | 11/2017 | Cerk et al. |
| 10,232,998 B2 | 3/2019 | Presche |
| 10,349,766 B2 | 7/2019 | Asseldonk et al. |
| 10,888,826 B2 | 1/2021 | Waggoner et al. |
| 2001/0025859 A1* | 10/2001 | Dumont ................. B05B 15/30 |
| | | 222/136 |
| 2001/0055242 A1 | 12/2001 | Deshmukh et al. |
| 2003/0168474 A1 | 9/2003 | Widgery |
| 2004/0007594 A1 | 1/2004 | Esch et al. |
| 2004/0116036 A1 | 6/2004 | Nugent et al. |
| 2004/0188280 A1 | 9/2004 | Young |
| 2004/0262331 A1 | 12/2004 | Woolfson et al. |
| 2005/0115845 A1 | 6/2005 | Cho |
| 2005/0234422 A1 | 10/2005 | Oh et al. |

(56) References Cited

U.S. PATENT DOCUMENTS

| | | |
|---|---|---|
| 2005/0258082 A1 | 11/2005 | Lund et al. |
| 2006/0011664 A1 | 1/2006 | Hammond |
| 2006/0021919 A1 | 2/2006 | Olson et al. |
| 2007/0102394 A1 | 5/2007 | Olsen et al. |
| 2007/0138179 A1 | 6/2007 | Jacobs et al. |
| 2007/0253280 A1 | 11/2007 | Orben et al. |
| 2008/0099487 A1 | 5/2008 | Winn |
| 2008/0116221 A1 | 5/2008 | Roth et al. |
| 2008/0149585 A1 | 6/2008 | Valentine |
| 2008/0190958 A1 | 8/2008 | Wyner et al. |
| 2009/0026222 A1 | 1/2009 | Seelhofer |
| 2009/0226585 A1 | 9/2009 | Wroblewski et al. |
| 2009/0236303 A1 | 9/2009 | Lizerbram et al. |
| 2010/0065584 A1 | 3/2010 | Berger |
| 2010/0108715 A1 | 5/2010 | Santagiuliana |
| 2010/0157723 A1 | 6/2010 | Vega |
| 2010/0213223 A1 | 8/2010 | Ballentine |
| 2011/0006071 A1 | 1/2011 | Koumans |
| 2011/0089059 A1 | 4/2011 | Lane et al. |
| 2011/0259769 A1 | 10/2011 | Salinas |
| 2011/0290677 A1 | 12/2011 | Simonian et al. |
| 2011/0290678 A1 | 12/2011 | Simonian et al. |
| 2012/0000880 A1 | 1/2012 | Im |
| 2012/0017766 A1 | 1/2012 | Anson et al. |
| 2012/0031925 A1 | 2/2012 | Greenberg |
| 2012/0223100 A1* | 9/2012 | Simonian ............ B65D 51/2892 222/145.1 |
| 2012/0255973 A1 | 10/2012 | Schlueter et al. |
| 2013/0000733 A1 | 1/2013 | Gothard et al. |
| 2013/0008919 A1 | 1/2013 | Honan et al. |
| 2013/0139893 A1 | 6/2013 | Anson et al. |
| 2013/0240564 A1 | 9/2013 | Albaum |
| 2013/0319915 A1 | 12/2013 | Gellibolian et al. |
| 2013/0334250 A1 | 12/2013 | Albaum |
| 2014/0076173 A1 | 3/2014 | Pellaud et al. |
| 2014/0092703 A1 | 4/2014 | Helou et al. |
| 2014/0230659 A1 | 8/2014 | Waggoner et al. |
| 2015/0065587 A1 | 3/2015 | Ochoa et al. |
| 2015/0128811 A1 | 5/2015 | Durairajasivam et al. |
| 2015/0158654 A1 | 6/2015 | Petrov |
| 2015/0336722 A1 | 11/2015 | Brook-Chrispin et al. |
| 2015/0336724 A1* | 11/2015 | Simonian ............ B65D 51/2892 222/546 |
| 2016/0001936 A1 | 1/2016 | Rap et al. |
| 2016/0143583 A1 | 5/2016 | Jeukendrup et al. |
| 2016/0150914 A1 | 6/2016 | Waggoner et al. |
| 2016/0152408 A1 | 6/2016 | Fuchs et al. |
| 2016/0159632 A1 | 6/2016 | Wheatley et al. |
| 2016/0317985 A1 | 11/2016 | Mutschler et al. |
| 2017/0232406 A1 | 8/2017 | Waggoner et al. |
| 2018/0178957 A1 | 6/2018 | Zalewski |
| 2018/0296023 A1 | 10/2018 | Waggoner et al. |
| 2019/0060849 A1 | 2/2019 | Waggoner et al. |
| 2019/0291065 A1 | 9/2019 | Waggoner et al. |
| 2020/0139313 A1 | 5/2020 | Waggoner et al. |
| 2020/0156020 A1 | 5/2020 | Waggoner et al. |
| 2021/0060503 A1 | 3/2021 | Waggoner et al. |
| 2021/0169264 A1 | 6/2021 | Waggoner et al. |

FOREIGN PATENT DOCUMENTS

| | | |
|---|---|---|
| CN | 101432221 A | 5/2009 |
| CN | 101068745 B | 6/2012 |
| CN | 110612050 A | 12/2019 |
| CN | 107205565 B | 7/2020 |
| EP | 0795267 A2 | 9/1997 |
| EP | 3220783 B1 | 8/2019 |
| JP | H068999 A | 1/1994 |
| JP | 2001500205 A | 1/2001 |
| JP | 2005289518 A | 10/2005 |
| JP | 2009107672 A | 5/2009 |
| JP | 2010195481 A | 9/2010 |
| JP | 2012006663 A | 1/2012 |
| JP | 2013517188 A | 5/2013 |
| JP | 2013545673 A | 12/2013 |
| JP | 2018503571 B | 7/2020 |
| SG | 11201407344 | 12/2014 |
| WO | 1998005853 A1 | 2/1998 |
| WO | 9947450 A1 | 9/1999 |
| WO | 1999047450 A1 | 9/1999 |
| WO | 2001000521 A1 | 1/2001 |
| WO | 2011149501 A1 | 12/2011 |
| WO | 2016081925 A1 | 5/2016 |
| WO | 2017152192 A1 | 9/2017 |
| WO | 2018156816 A1 | 8/2018 |
| WO | 2020046976 A2 | 3/2020 |
| WO | 2021108781 A1 | 6/2021 |

OTHER PUBLICATIONS

Supplemental European Search Report dated Nov. 16, 2020 in EP Application No. 18757631.9.
English Translation of first Office Action dated Jan. 8, 2019 in China Application No. 201580062670.9.
English Translation of Office Action and Search Report dated May 13, 2020 in CN Application 201780013261.9.
English translation of Office Action dated Mar. 30, 2021 in Japanese Application No. 2018-545355.
English translation of Office Action dated Jul. 30, 2019 in JP Application No. 2017-545871.
International Search Report and Written Opinion for International App. No. PCT/US2015/62026 dated Feb. 5, 2016 (11 pages).
International Search Report and Written Opinion of the International Searching Authority in International Application No. PCT/US19/48389 dated Jan. 17, 2020.
Supplemental European Search Report and European Search Opinion dated Jun. 13, 2018 in EP Application No. 15861063.4.
Supplemental European Search Report and Opinion dated Jul. 9, 2019 in EP Application 17760997.1.
AU Application 2017228456, Examination Report No. 1 dated Jan. 25, 2022.
Japanese Application 20201113813.0, English Translation of Office Action dated Aug. 6, 2021.
PCT/US21/41887 Invititation to Pay Additional Fees dated Oct. 6, 2021.
PCT_US21_41887 International Search Report and Written Opinion dated Dec. 23, 2021.
EP Application No. 19854883.6 Extended European Search Report dated Apr. 19, 2022.
PCT/US2018/19295 International Search Report and Written Opinion of the International Searching Authority dated May 16, 2018.
PCT/US2020/062521 International Search Report and Written Opinion of the International Searching Authority dated May 7, 2021.
AU Application 2015349694 Examination Report No. 1 dated May 10, 2019.
AU Application 2020217420 Examination Report No. 1 dated May 31, 2021.
AU Application 2020217420 Examination Report No. 2 dated May 17, 2022.
CN Application 201880012762.X Office Action dated Oct. 27, 2021.
U.S. Appl. No. 14/181,354, filed Feb. 14, 2014, Waggoner et al.
U.S. Appl. No. 14/948,225, filed Nov. 20, 2015, Waggoner et al.
U.S. Appl. No. 15/451,384, filed Mar. 6, 2017, Waggoner et al.
U.S. Appl. No. 15/791,348, filed Oct. 23, 2017, Waggoner et al.
U.S. Appl. No. 15/903,014, filed Feb. 22, 2018, Waggoner et al.
U.S. Appl. No. 16/235,913, filed Dec. 28, 2018, Waggoner et al.
U.S. Appl. No. 16/436,861, filed Jun. 10, 2019, Waggoner et al.
U.S. Appl. No. 16/679,060, filed Nov. 8, 2019, Waggoner et al.
U.S. Appl. No. 17/067,546, filed Oct. 9, 2020, Waggoner et al.
U.S. Appl. No. 17/106,053, filed Nov. 27, 2020, Waggoner et al.
U.S. Appl. No. 17/146,463, filed Jan. 11, 2021, Waggoner et al.
U.S. Appl. No. 17/377,259, filed Jul. 15, 2021, Waggoner et al.
U.S. Appl. No. 17/539,833, filed Dec. 1, 2021, Waggoner et al.
U.S. Appl. No. 17/567,796, filed Jan. 3, 2022, Waggoner et al.
U.S. Appl. No. 17/567,799, filed Jan. 3, 2022, Waggoner et al.

(56) References Cited

OTHER PUBLICATIONS

U.S. Appl. No. 17/567,801, filed Jan. 3, 2022, Waggoner et al.

* cited by examiner

US 11,583,811 B2

ADJUSTABLE ADDITIVE CARTRIDGE SYSTEMS

CROSS-REFERENCE TO RELATED APPLICATIONS

This is a continuation of U.S. application Ser. No. 14/948,225, filed on Nov. 20, 2015, and claims the priority benefit thereof under all applicable provisions, laws and treaties, which application further claims the priority benefit of US provisional patent application Ser. No. 62/083,129 titled "ADJUSTABLE ADDITIVE CARTRIDGE SYSTEMS," filed on Nov. 21, 2014, the disclosure and subject matter of which is hereby incorporated by reference in its entirety. Where an element or subject matter of this application or a part of the description, claims or drawings in the aforementioned provisional application is not otherwise contained in this application, that element, subject matter or part is incorporated by reference in this application for the purposes of any and all applicable rules, procedures or laws.

TECHNICAL FIELD

This document relates to fluid storage, dispensing and delivery systems for beverages and other products. More specifically, this document relates to dispensing and delivery systems that utilize cartridges for providing an additive, such as flavoring concentrate or nutritional or vitamin supplements, in controlled and adjustable amounts, to a base liquid, such as water, as the base liquid is dispensed through the cartridge. The document also relates to cartridge and container systems that enable a user to utilize multiple cartridges, each having a different additive, interchangeably with a given supply of base liquid, such that the additive can be combined with the base liquid for consumption or other use, while a supply of base liquid, such as that in container (i.e., water bottle) remains in a pure, unmixed state.

BACKGROUND

The prior art includes various devices for providing additives to a base liquid. Such devices include pre-mix systems, such as those described in U.S. Pat. No. 7,306,117, in which a predetermined amount of additive is dispensed into a base liquid within the container and mixed therewith prior to consumption. Prior art systems also include devices in which an additive is provided to a base fluid as it is dispensed from a container. Such delivery systems are exemplified by U.S. Pat. No. 8,230,777, which describes a dispensing system in which a base liquid flows through a supplement area containing solid supplements, and U.S. Pat. No. 8,413,844, which describes a water dispenser (pitcher) having a filter and an additive chamber in which the additive is dispensed as water is poured from the dispenser.

SUMMARY

One aspect of the invention provides an adjustable additive cartridge that provides adjustable metering of additive to a base fluid as the base fluid is flowing through the cartridge. The cartridge may be readily adapted to a portable container, such as a sports bottle or off-the-shelf water bottle. Because the cartridge provides additive to the base fluid as it flows through the cartridge, an additive and base fluid mixture can be dispensed while the supply of base fluid contained within a container used with the cartridge may be kept in an unmixed, pure state. Moreover, aspects of the invention provide for the use of multiple cartridges, each having different additives (i.e., flavors) interchangeably with a given container and given supply of base fluid. Modular additive cartridges according to aspects of the invention may be used with containers storing a supply of base fluid to allow a consumer/user to experience different additives, such as different flavors or supplement compositions, with the same supply of base liquid.

Yet another aspect of the invention provides an additive cartridge with an integrated filter for filtering base fluid flowing into the cartridge.

Yet another aspect of the invention provides an additive cartridge that is sealed to provide for extended storage and to provide a user/consumer with evidence of integrity, quality and/or tampering prior to purchase and/or use.

Yet another aspect of the invention provides an additive cartridge with visual and tactile indicators of the amount of additive being added to a base fluid.

Yet another aspect of the invention provides a cartridge and container combination wherein the container includes elements for retaining a spare additive adjustable cartridge on the container.

Unless otherwise defined, all technical and scientific terms used herein have the same meaning as commonly understood by one of ordinary skill in the art to which the described invention pertains. Although other implementations, methods and materials similar to those described herein can be used to practice the invention, suitable and example implementations, methods and materials are described below. All publications, patent applications, and other references mentioned herein are incorporated by reference in their entirety. In case of conflict, the present specification, including definitions, will control. In addition, the materials, methods and examples are illustrative only and are not intended to be limiting in any way. The details of one or more example implementations of the invention are set forth in the accompanying drawings and the description below. Other features, objects and advantages of the invention will be apparent from the description and drawings, and from the claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

Figure 1:
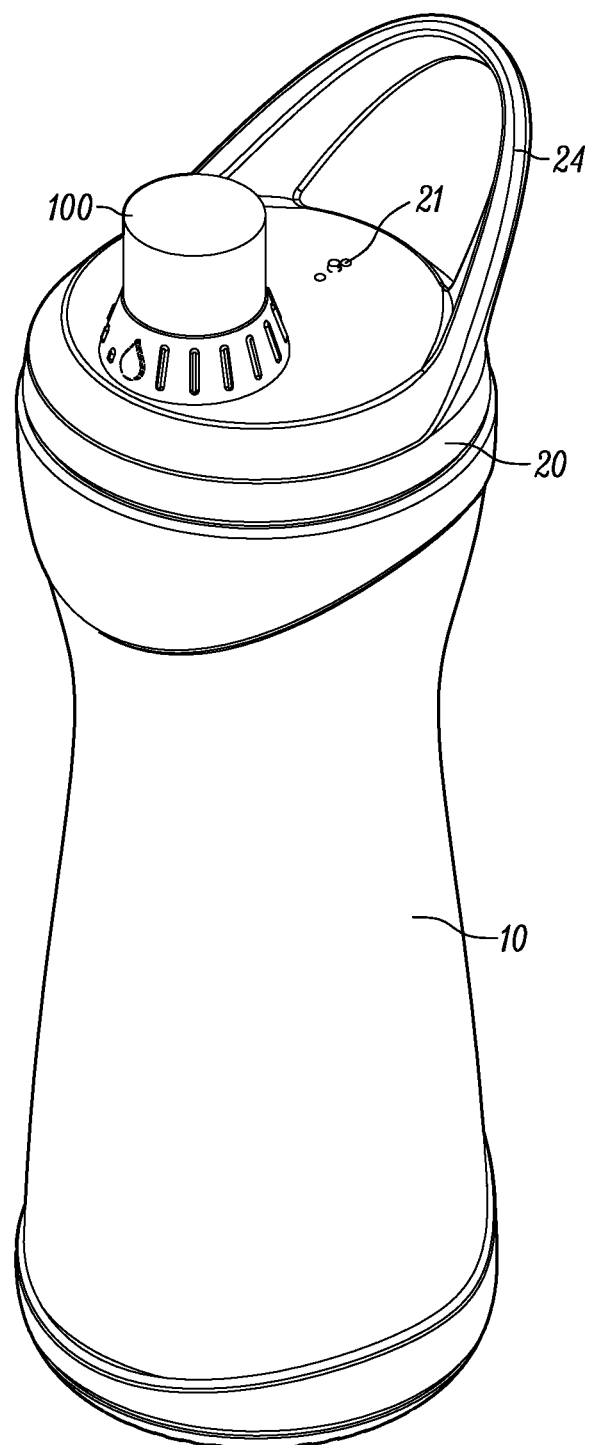
FIG. 1 is a perspective view of an example cartridge and container system according to an aspect of the invention.
Figure 2:
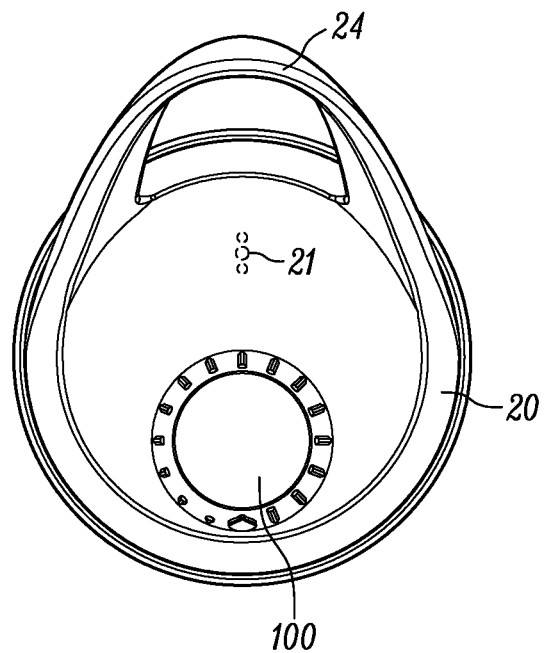
FIG. 2 is a top view of the cartridge and container system of FIG. 1.

Referring to FIGS. 1 and 2, an example adjustable additive cartridge 100, according to an aspect of the invention, may be used in combination with a container 10, such as a portable water bottle, having a cap 20 in threaded and sealing engagement with the container body. The cap 20 may include a carrying handle 24 formed integrally therewith. One or more vent holes 21 are provided in the cap 20 to permit inflow of air to the interior of the container 20.

Figure 3:
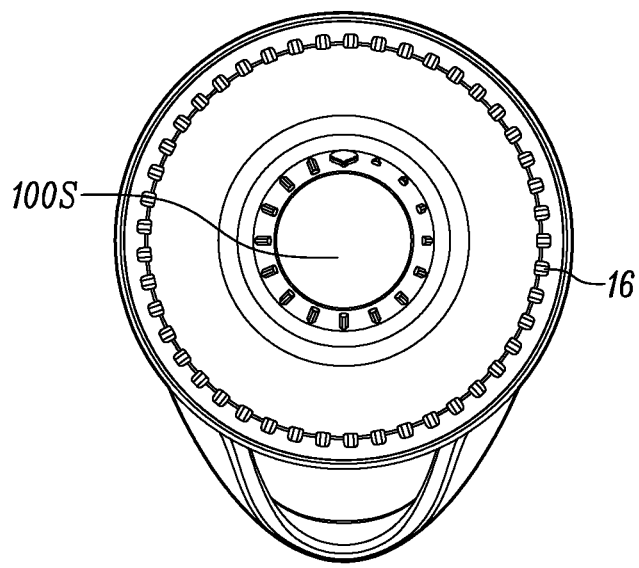
FIG. 3 is a bottom view of the cartridge and container system of FIG. 1.

Referring additionally to FIG. 3, which is a bottom view of the container 20 of FIG. 1, according to a further aspect of the invention, containers used in combination with the adjustable additive cartridge may include implements for securely storing one or more spare cartridges 100S thereon.

Figure 4:
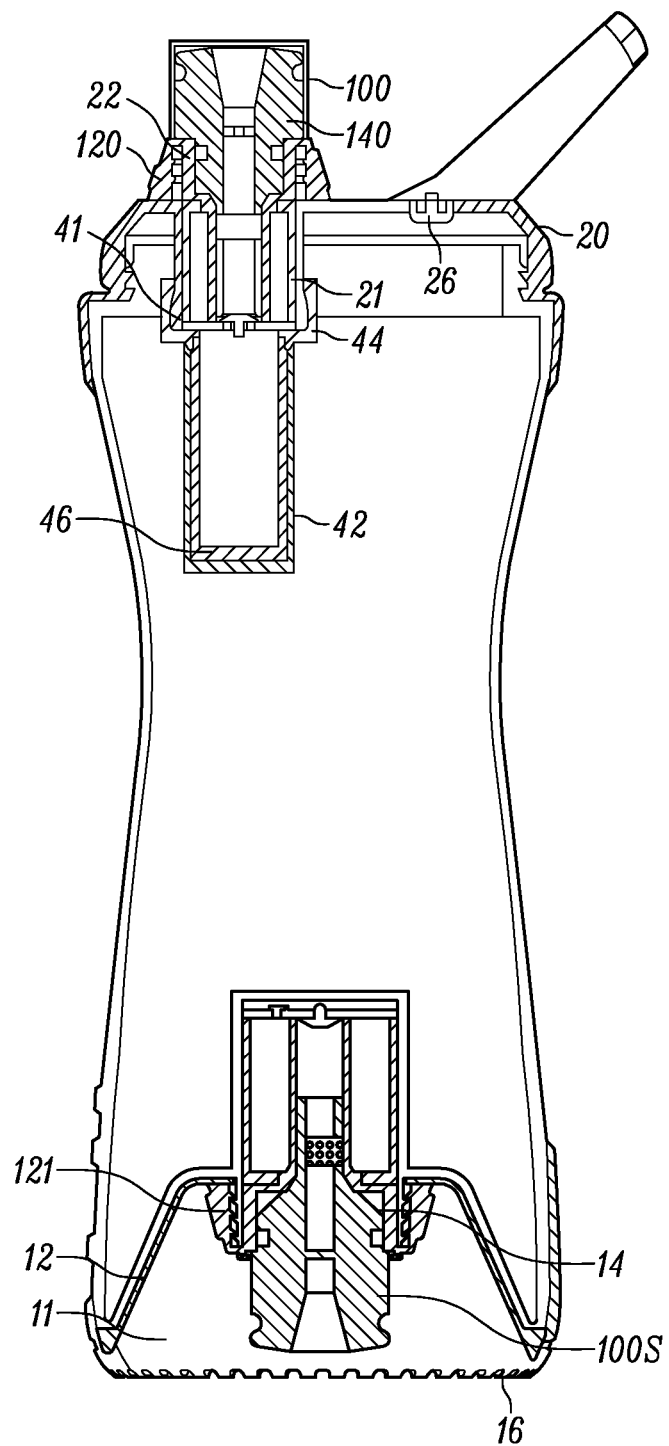
FIG. 4 is a cross-section of the cartridge and container system of FIG. 1.
Figure 5:
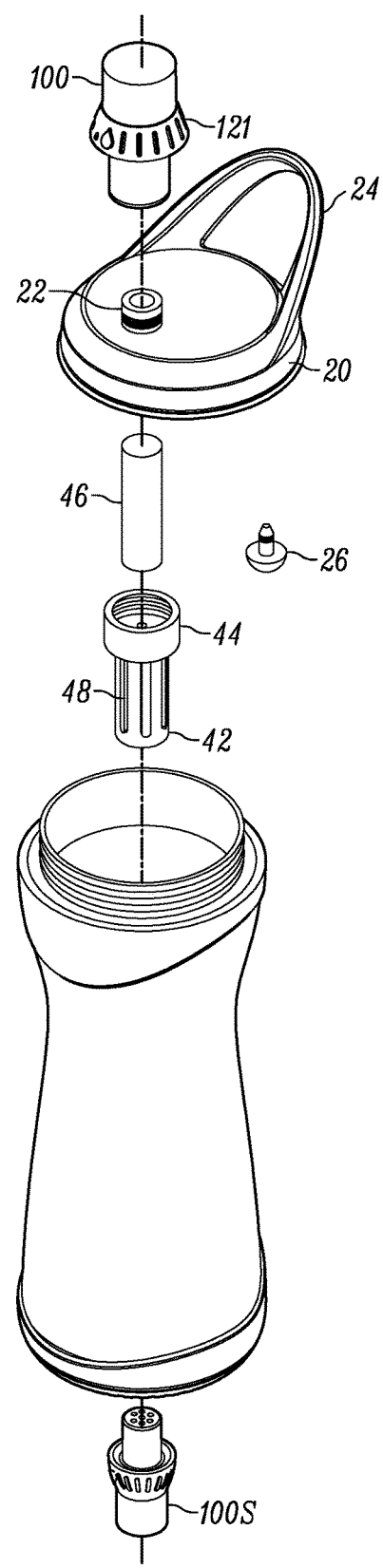
FIG. 5 is an exploded, perspective view of the cartridge and container system of FIG. 1.

FIGS. 4 and 5 illustrate in further detail the primary components of an example container and cartridge system according to aspects of the invention. Cartridge 100, which is in use, is secured to container cap 20, which includes a threaded cartridge-retaining collar 22 to which a correspondingly threaded retaining portion 121 of the cartridge base 120 is secured. As will be recognized, other implements may be used for providing secure, sealing engagement of the cartridge 100 to the cap, such as snap fit elements, 0-rings and the like.

Figure 6:
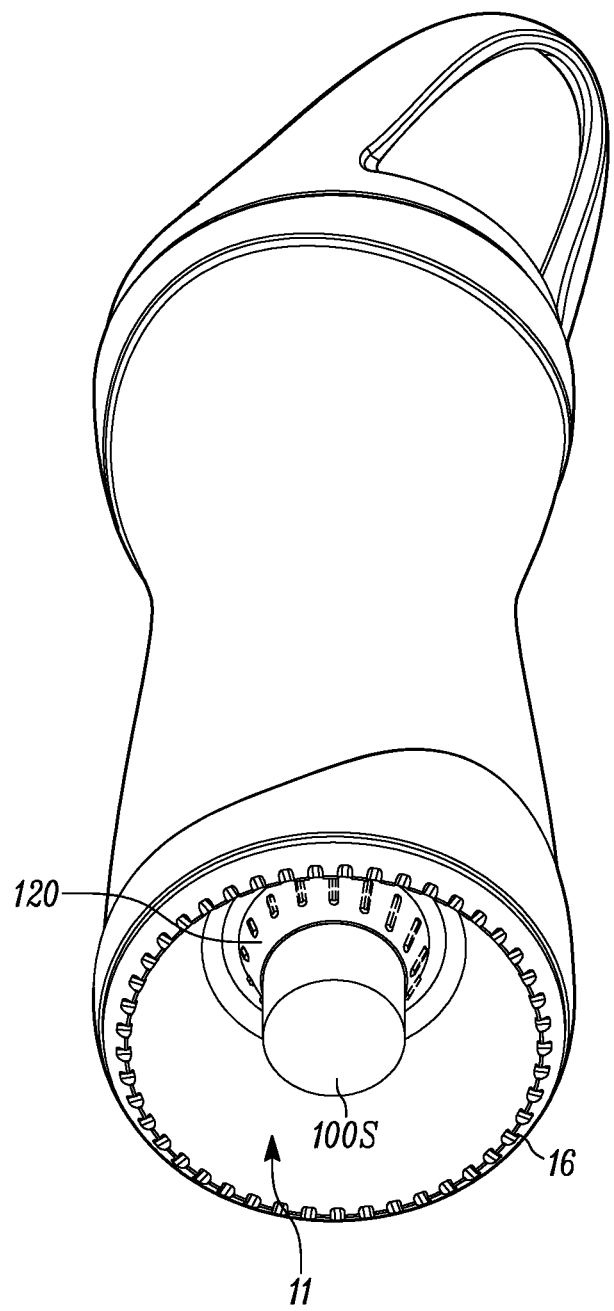
FIG. 6 is a bottom perspective view of the cartridge and container system of FIG. 1.
Figure 7:
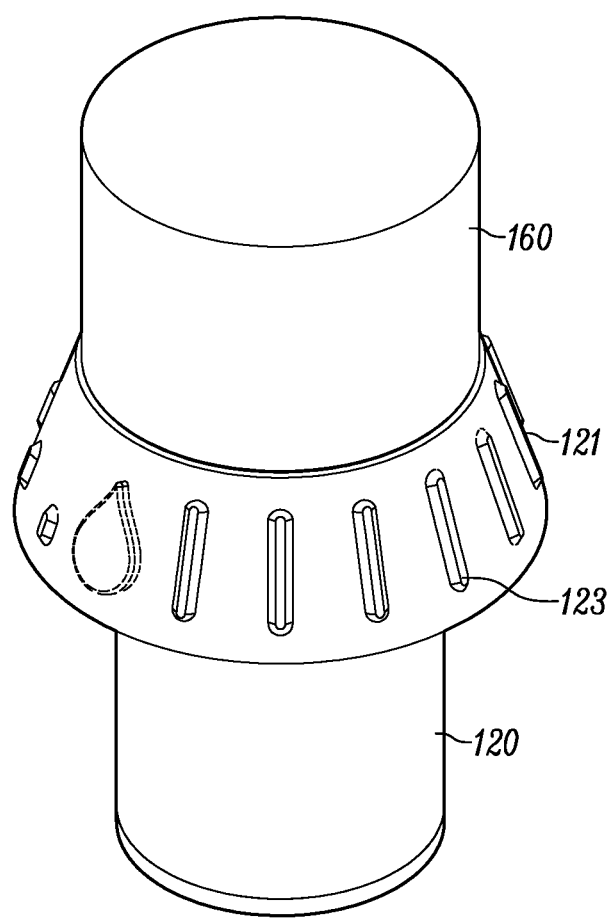
FIG. 7 is a perspective view of an example cartridge according to an aspect of the invention.
Figure 8:
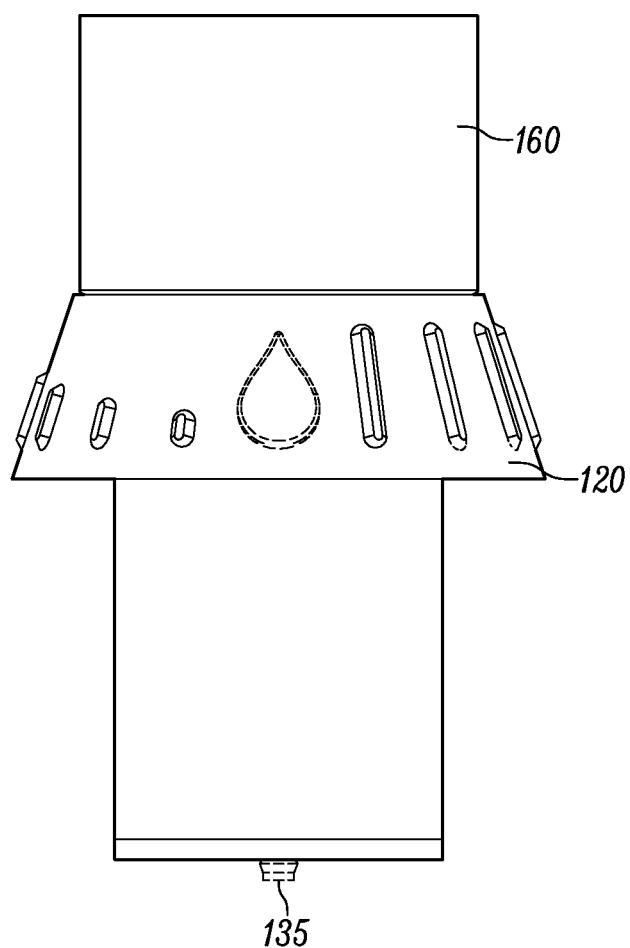
FIG. 8 is a side view of the cartridge of FIG. 7.
Figure 9:
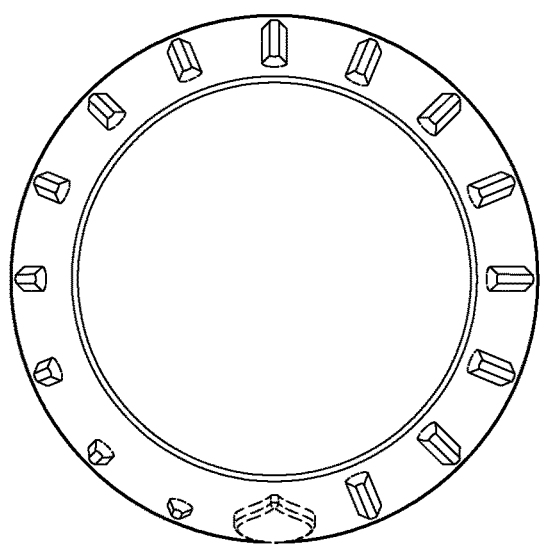
FIG. 9 is a top view of the cartridge of FIG. 7.
Figure 10:
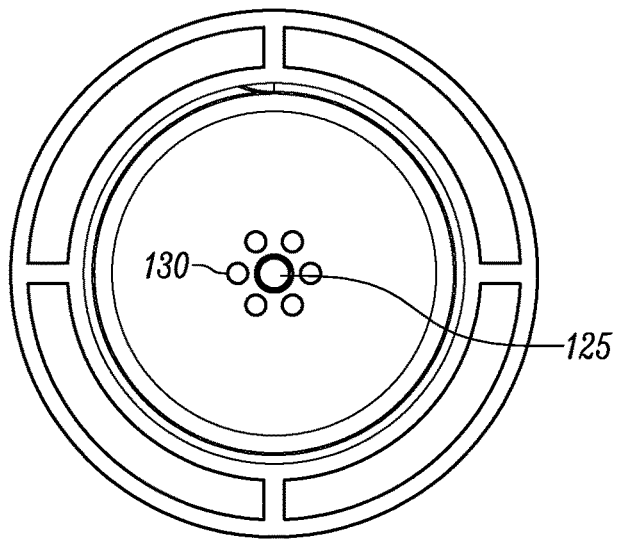
FIG. 10 is a bottom view of the cartridge of FIG. 7.

In a similar fashion, and referring additionally to FIG. 6, spare cartridge 100S may be secured to a bottom portion of the container 10 and housed within a recess 11 formed therein. A spare cartridge retaining collar 14 also formed in the container bottom or fastened thereto, provides for threaded engagement of a threaded retaining portion 121 on the base 120 of the spare cartridge 100S. A number of gripping elements, such as gripping teeth 16 may be formed on the bottom of the container 10 for preventing the container from slipping on a surface.

A filter assembly (see FIGS. 4 and 5, particularly) may include a filter housing 42 having at least one passage 48 therein for permitting inflow of base fluid from the container, and a threaded collar 44 for engaging a threaded filter retaining collar 21 (Figure 4) on the underside of cap 20. A porous, activated carbon filtration element 46, which may be solid or annular, may be housed within the filter housing 42 for filtering the base liquid contained in container 10 as the base liquid flows from the container through the filtration assembly and into the cartridge 100. A silicone air inlet valve 26 is provided in the cap for permitting the flow of air into the container as liquid is dispensed, while preventing outflow.

FIGS. 7-14 illustrate details of an example cartridge 100 according to aspects of the invention. Cartridge 100 may include a spout sealing cap 160, which may be snap fit onto a cartridge base 120, which includes a tapered and threaded retaining collar 121, having visual and tactile indicia 123 thereon for indicating a flavor intensity provided by the adjustable cartridge as will be explained. Spout sealing cap 160, and the cartridge 100 as a whole may be provided with a tamper proof element (not shown) such as a shrink-wrapped frangible plastic membrane provided around the entire cartridge so as to assure quality, safety and a tamper-free state of the cartridge prior to purchase and use.

Figure 11:
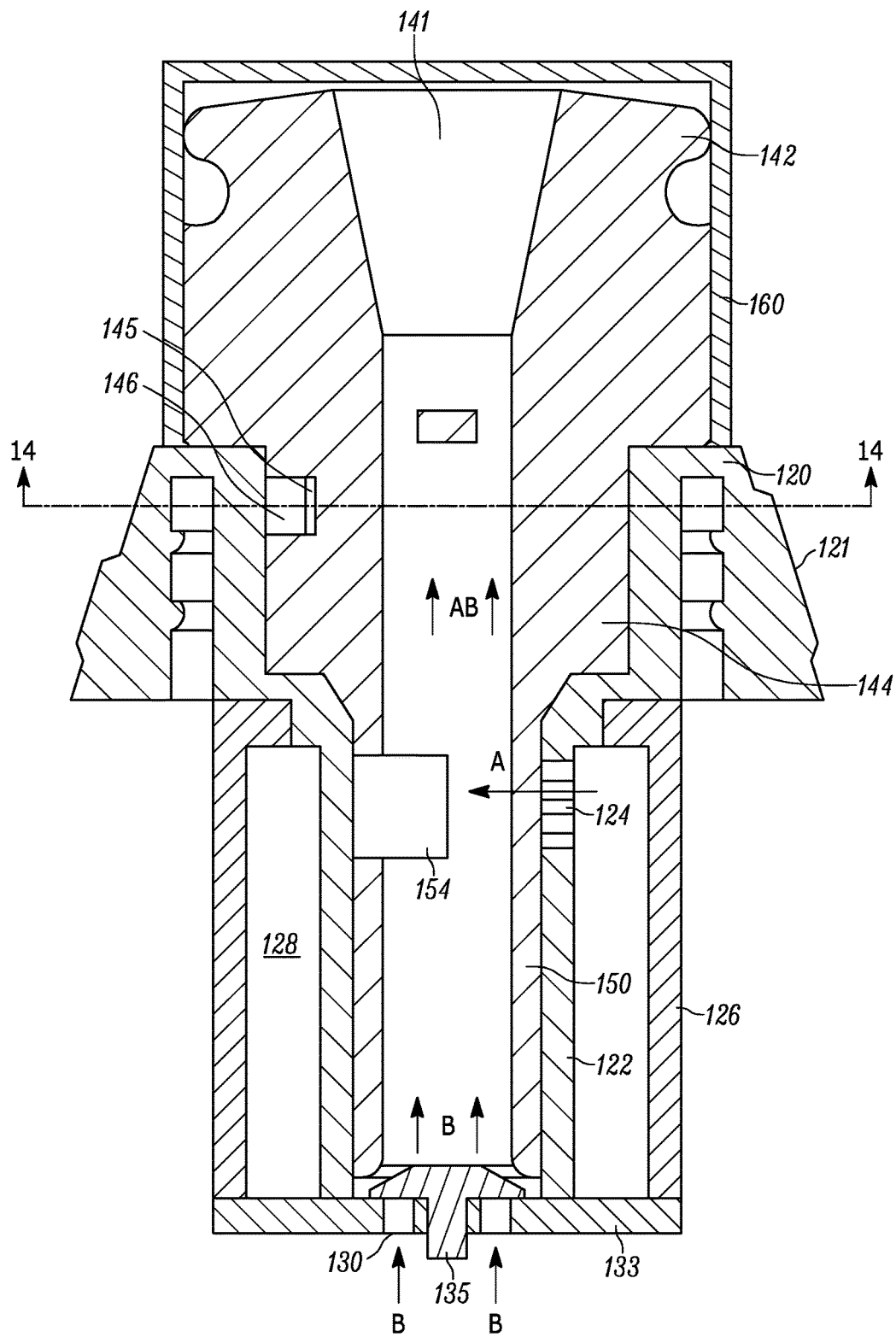
FIG. 11 is a cross-section of the cartridge of FIG. 7 in an assembled configuration.
Figure 12:
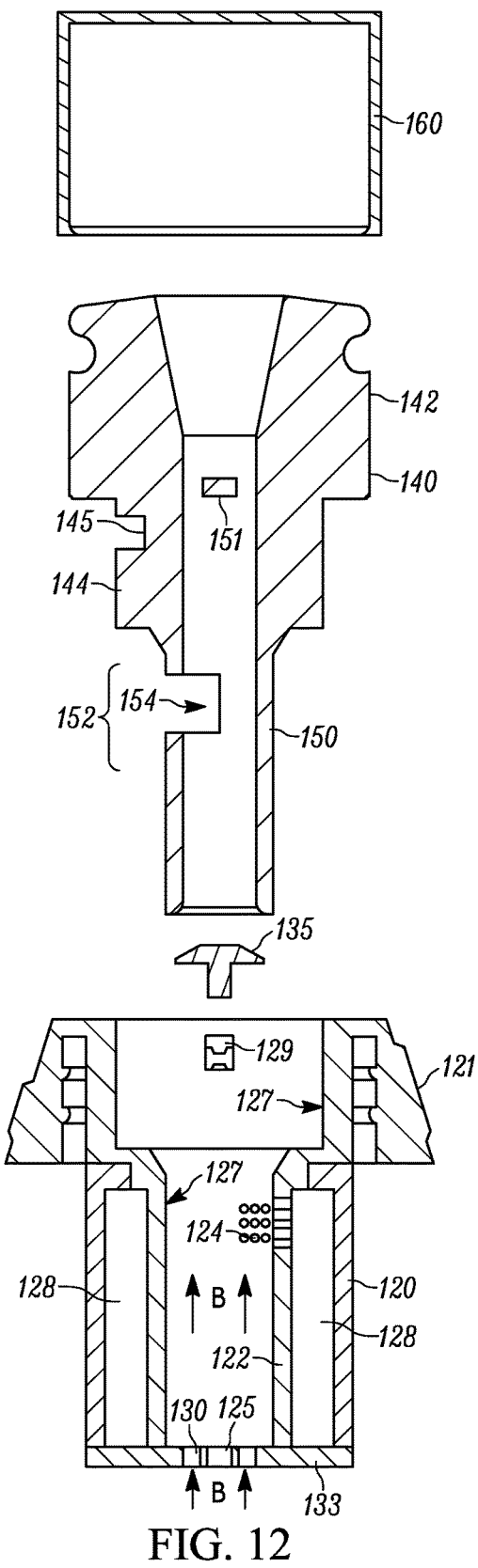
FIG. 12 is an exploded, cross-section of the cartridge of FIG. 7.
Figure 13:
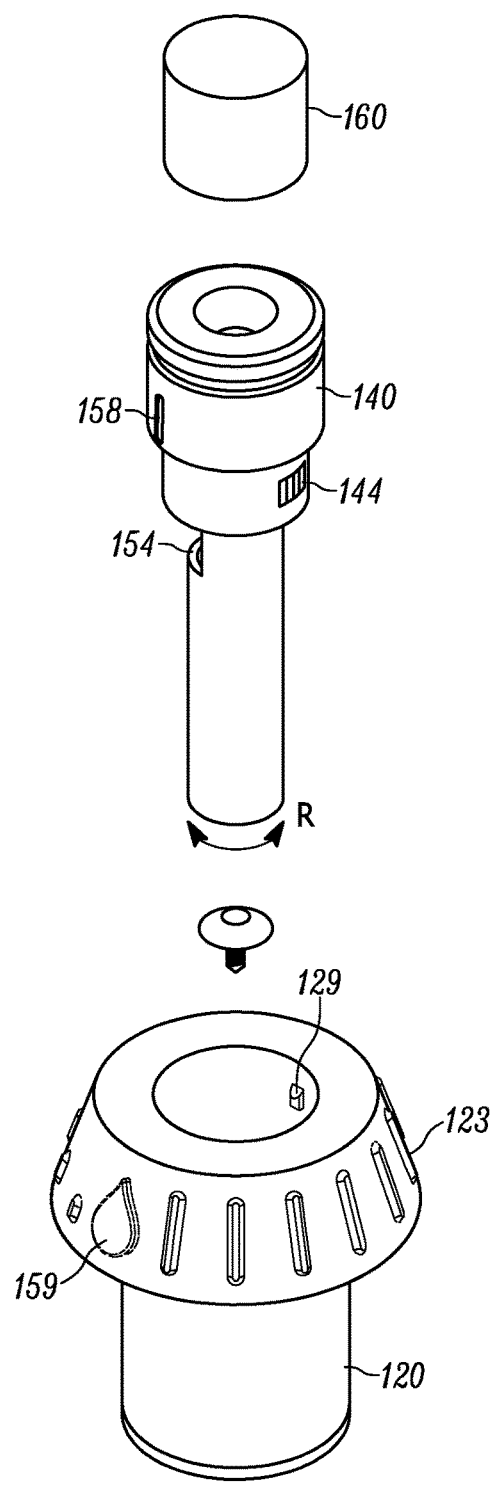
FIG. 13 is an exploded, perspective view of the cartridge of FIG. 7.

Referring particularly to FIGS. 11 and 12, the cartridge 100 may generally comprise three components—a spout 140, cartridge base 120 and spout sealing cap 160. Spout 140 and cartridge base 120 cooperate to provide for adjustable flow of additive from the cartridge to a base fluid flow path, referenced by arrows "B" in FIG. 11. An additive flow path, referenced by arrow "A" in FIG. 11 (which shows the additive flow path obstructed by the spout stem 150) is also defined within the cartridge. Base fluid flow and additive flow are combined in an additive and base fluid combined flow path referenced by arrows "AB" in FIG. 11.

Cartridge base 120 may include an inner annular wall 122, an outer annular wall 126 and a cartridge bottom wall 133, which define an annular additive reservoir 128. Bottom wall 133 may include one or more inlet ports 130 (see also FIG. 10), which provide for the entry of base fluid into the cartridge, for example, from an outlet of the filter assembly described above. A base fluid flow check valve 135 may be secured in the bottom wall 133 and may include a flexible silicone rubber "button" shaped element with a stem portion being frictionally secured in an aperture 125 through the bottom wall 133 of the cartridge 100. Check valve 135 ensures only one-way flow of the base fluid into the cartridge 100 and prevents backflow into the filter assembly and/or container 10. As will be recognized, the dimensions of inlet ports 130, as well as the materials and dimensions of check valve 135 may be varied to achieve appropriately controlled flow rates of the base fluid through the cartridge 100.

To provide for the metered and controlled flow of additive from the additive reservoir 128 and into the base fluid flow path, as will be described further below, one or more additive metering ports 124 may be formed in the inner annular wall 122 of cartridge base 120. Metering ports 124 may extend in a matrix pattern around a portion of the inner annular wall 122. Inner annular wall 122 may define a portion of a spout receiving annulus 127 for receiving and securing the spout 140 for rotational movement therein. An interference projection or tab 129 is formed on the cartridge base 120 for engaging metering adjustment detents on the spout 140 as will be described.

Spout 140 may include a top outlet section 142, a detent section 144 and an annular stem 150. When assembled with cartridge base 120, annular stem 150 extends into the annular space 127 defined by the inner annular wall 122. Annular stem 150 includes an additive metering section 152 with an additive flow slot 154 formed in the stem and extending a portion of the circumference of the stem. When the spout 140 is assembled with the base 120, spout 140 may rotate in the direction of arrow "R" (FIG. 13) such that additive metering section 152 may permit or obstruct flow through the metering ports 124. More particularly, metering section may be rotated to a position where the surface of stem 150 completely obstructs the metering ports 124 (as shown in FIG. 11), in which case no additive is permitted to flow into the base fluid flow path (corresponding to a "water only" setting on the cartridge, for example). Further, when flow of additive is desired, spout 140 and metering section 152 may be rotated to a position where the slot 154 is located adjacent some or all of the ports 124, providing for corresponding levels of flow of additive through ports 124 and into the base fluid flow path. In this manner, the amount of additive mixed with the base fluid may be adjusted by rotation of the spout 140 within the cartridge base.

According to another aspect of the invention, collar 121 may be provided with visual and tactile indicia corresponding to the additive flow settings provided for various rotational positions of the spout 140 within the cartridge base. An index or other indicator 158 (FIG. 13) may be provided on the spout 140 such that it aligns with one of the indicators 123 on the base collar 121 for a given rotational position. A "water-only" indicator 159 may also be provided on the collar 121, corresponding with a fully closed position of the additive flow path.

Figure 14:
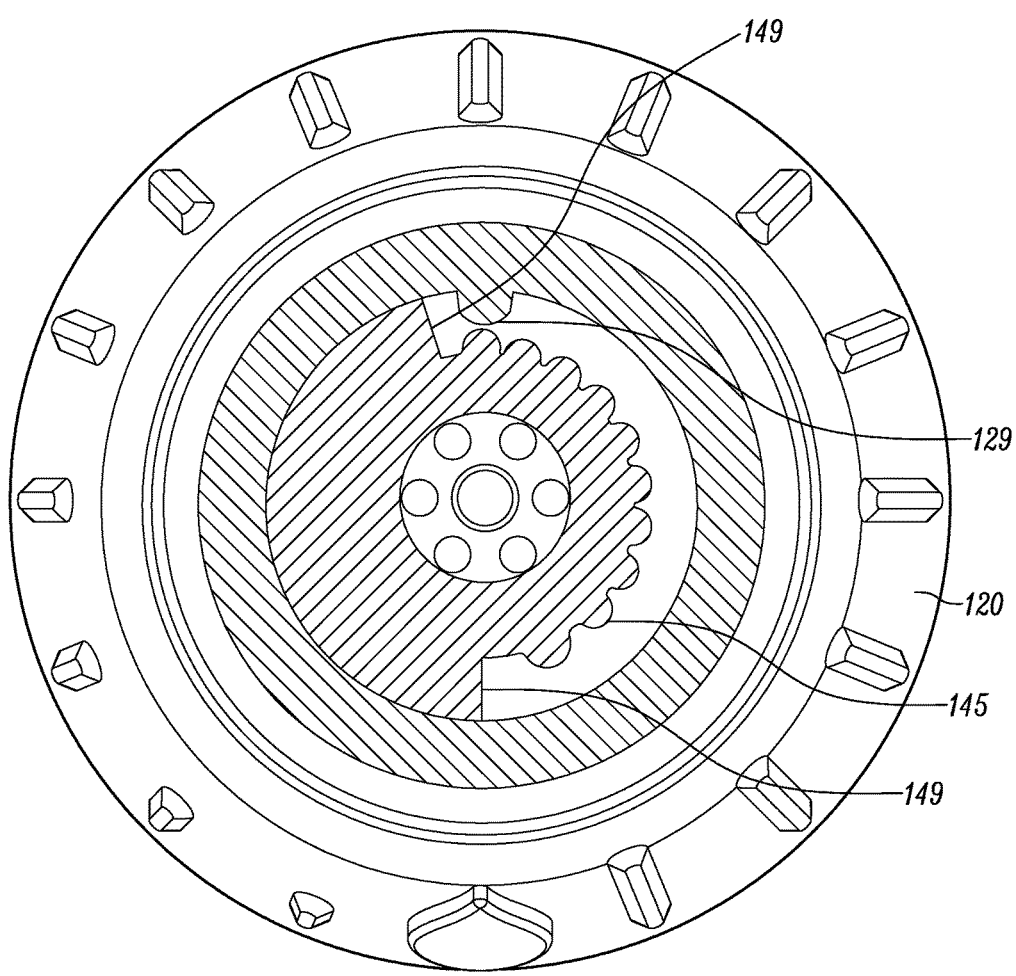
FIG. 14 is a top, sectional view of the cartridge of FIG. 7 taken in plane 14-14 of FIG. 11.

According to another aspect of the invention, the cartridge base 120 and spout 140 are provided with elements that ensure a positive rotational position of the spout 140 relative to the cartridge base. Referring additionally to FIG. 14, which is a cutaway view of the cartridge base 120 and spout 140 taken into plane 14-14 in FIG. 11, an interference tab or projection 129 extends into an annular slot 146 formed in the detent portion 144 of spout 140. The slot may extend only partially around the detent portion 144 to provide stopping surfaces 149 (FIG. 14) that engage projection 129 and thereby limit the rotation of spout 140 within the cartridge base 120. A series of projecting tabs or detent elements 145 extend in a manner that cause frictional engagement with projection 129 (for clarity in description, FIG. 14 shows the elements 129 and 145 not touching, it being understood that some overlap, deformation and friction will be present). The interaction of interference tab 129 with detent elements 145 provides for positive rotational positions of the spout 140 within the base 120. These positions correspond with the indicia on collar 121 such that the user can gauge the rotational position of the spout 140 within the base 120, and the corresponding level of additive being provided for mixing with the base fluid.

Threaded retaining collar 121 of cartridge base 120 is provided with indicia to indicate the mount of flavoring intensity (i.e., with vertical projections of increasing size). A corresponding index or pointer 158 on the spout indicates the rotational position of the spout 140 within the base 120. According to an aspect of the invention, the cartridge may be configured to a "water-only" mode, as indicated by the droplet indicator 159, where the flavor metering ports 124 would be completely blocked by the flavor metering section 152 because of the corresponding rotational position of the stem 150 within cartridge base 120. In this mode, unflavored and filtered base liquid (water) may be dispensed from the container without any complex reconfiguring required by the consumer. The one-way or check valve 135 prevents backflow of water and/or flavor concentrate into the container interior.

As will be recognized, the flow of base fluid through the spout stem 150 will cause the additive to flow through the metering ports 124 such that the additive mixes with the base fluid in a controlled manner. A user may adjust the amount of additive added to the base liquid by rotating the spout (additive metering adjuster) 140 within the cartridge base. The dimensions of the metering ports 124 may be selected to provide appropriate flow of additive. Metering ports having a diameter of approximately 0.03 inches have been found to provide for suitable metering of additive liquid, while permitting the retention (non-leakage) of additive liquid from the additive reservoir and preventing flow of the base fluid through the metering ports and into the reservoir.

As will be recognized, the diameter of metering ports may be varied depending on the viscosity of the additive liquid and other parameters such that flow occurs in appropriate quantities. A turbulence-creating projection 151 may be provided in the flow path to enhance the mixing and uniform dilution of the additive within the base fluid.

The check valve 135 and inlet ports 130 may be configured in appropriate dimensions to provide for controlled flow of the base fluid over a range of container pressures (i.e., such as those caused by a user squeezing the container in the case of a flexible container). For additional control of the base fluid flow through the cartridge, container 10 may be provided as a rigid (i.e., not substantially squeezable or flexible) container 10 so that user compression of the container does not influence flow of the base liquid through the cartridge or additive, where instead fluid exits the container by gravity with the container is inverted and flows at a more uniform rate. An air inlet valve 26 on the cap 20 (FIG. 3) may provide replacement air (i.e., and prevent a vacuum) as the base fluid flows from the container interior. The air inlet valve 26 may be a silicone "button" shaped valve with a stem that fits and is frictionally and/or compressively within an aperture in the cap 20 and a valve face that seals one or more vent holes 21 against flow out of the container, while permitting the flow of air into the container.

As will also be recognized, suitable thermoplastic polymers may be used to form the various aforementioned elements, including polyethylene terepthalate (PET), polycarbonate, high-density polyethylene (HDPE) and others.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the concepts described herein.

The invention claimed is:

1. An adjustable additive delivery system comprising:
   a base liquid container having an interior space for containing a base liquid;
   a cap for enclosing the base liquid container interior space;
   a cartridge, secured to the cap by a collar and including a cartridge base defining an additive reservoir for storing a supply of additive to be mixed with the base liquid;
   a base liquid flow path defined in the cartridge for permitting flow of base liquid from the base liquid container through the cartridge;
   an additive flow path for permitting flow of additive from the additive reservoir to the base liquid flow path;
   a spout including a spout flow path for permitting flow of additive and base liquid mixture therein to a dispensing end of the spout;
   wherein the additive reservoir is disposed on a side of the collar that is opposite the spout dispensing end such that the additive reservoir extends into the base liquid container interior space;
   an additive metering section disposed in the additive flow path to adjust the flow of additive flowing from the additive flow path to the base liquid flow path; and
   the spout having a surface that is rotatable relative to the cartridge base and adapted to operate as an additive metering adjuster for permitting a user to adjust the additive metering section, wherein rotation of the additive metering adjuster causes the additive metering section to vary the flow of additive in the additive and base liquid mixture.

2. The system of claim 1, wherein the additive metering adjuster is adapted to be rotated about an axis defined by the base liquid flow path.

3. The system of claim 1, wherein the additive metering section comprises at least one metering port defining at least part of the additive flow path.

4. The system of claim 1, further comprising a filter arranged on the cartridge base such that base liquid must flow through the filter before flowing into the cartridge.

5. The system of claim 1, wherein the metering section comprises a matrix of apertures.

6. The system of claim 5, wherein the spout includes an annular stem that fits within a corresponding annulus in the cartridge base, and wherein the metering section further comprises a surface on the spout annular stem that may selectively obstruct one or more of the apertures.

7. The system of claim 1, further comprising a check valve for preventing backflow of the base liquid.

8. The system of claim 1, further comprising a turbulence-creating projection disposed within the spout fluid flow path to enhance mixing of the additive and base liquid mixture.

9. The system of claim 1, wherein the collar includes a threaded portion for engaging a correspondingly threaded portion of the cap.

10. The system of claim 1, wherein the spout is rotatable within the cartridge base and wherein the spout includes a plurality of metering adjustment detents and wherein the cartridge base includes an interference projection adapted to engage the metering adjustment detents to secure the spout in a fixed rotational position relative to the cartridge base.

11. An adjustable additive cartridge for containing a supply of additive to be mixed with a base liquid contained in a base liquid container comprising:
   a cartridge base including a collar for securing the cartridge to a lid of the base liquid container, the cartridge base further including an additive reservoir for containing a supply of additive and a bottom wall having a cartridge inlet port defined therein;
   a spout arranged to rotate relative to the cartridge base, the spout having a spout outlet;
   the spout and additive reservoir disposed on opposite sides of the collar;
   a base liquid flow path defined in the cartridge for permitting flow of the base liquid from the cartridge inlet port through the cartridge to the spout outlet;
   an additive flow path defined in the cartridge for permitting flow of additive from the additive reservoir to the base liquid flow path; and
   an additive metering section disposed in the additive flow path for varying the flow of additive flowing from the additive reservoir to the base liquid flow path, wherein rotation of the spout relative to the cartridge base results in adjustment of the additive metering section.

12. The cartridge of claim 11, wherein the additive metering section comprises a surface that is adapted to be rotated about an axis that coincides with the base liquid flow path.

13. The cartridge of claim 11, herein the additive metering section comprises at least one metering port in an annular wall of the cartridge base.

14. The cartridge of claim 11, wherein the spout includes a stem extending into the cartridge base and wherein the additive metering section comprises a surface on the stem.

15. The cartridge of claim 11, wherein the additive metering section comprises a matrix of apertures on a surface of the cartridge base.

16. The cartridge of claim 11, wherein the spout includes a stem that extends into the cartridge base and wherein the additive metering section further comprises a surface on the spout stem that may selectively obstruct one or more of the apertures when the spout stem is rotated relative to the cartridge base.

17. The cartridge of claim 11, further comprising a check valve disposed in the cartridge base for preventing backflow of the base liquid through the cartridge.

18. The cartridge of claim 11, further comprising a filter arranged on the cartridge base such that base liquid must flow through the filter before flowing into the cartridge inlet port.

19. The cartridge of claim 11, wherein the spout includes a plurality of metering adjustment detents and wherein the cartridge base includes an interference projection adapted to engage the metering adjustment detents to secure the spout in respective rotational positions relative to the cartridge base.

20. An adjustable additive cartridge comprising:
   a cartridge base including a collar for securing the cartridge to a container;
   a spout adapted to rotate about a spout rotation axis relative to the cartridge base and having spout outlet;
   the cartridge base including an additive reservoir for containing a supply of additive and a bottom wall with least one inlet port for receiving inflow of base liquid;
   a base liquid flow path defined through the cartridge from the at least one inlet port to the spout outlet, the base liquid flow path extending substantially along the spout rotation axis through the cartridge;
   the cartridge base including an additive flow path from the additive reservoir to the base liquid flow path; and
   an additive metering section disposed in the additive flow path for varying the flow of additive flowing in the additive flow path in response to rotation of the spout.

* * * * *